US006646727B2

(12) United States Patent
Saleh et al.

(10) Patent No.: US 6,646,727 B2
(45) Date of Patent: Nov. 11, 2003

(54) POLARIZATION MODE DISPERSION CHARACTERIZATION APPARATUS AND METHOD

(76) Inventors: Bahaa E. A. Saleh, 7 Butterfield Rd., Lexington, MA (US) 02420; Malvin C. Teich, 70 Montgomery St., Boston, MA (US) 02116; Alexander Sergienko, 221 Massachusetts Ave., Boston, MA (US) 02115; Steven J. Bielagus, 5 Mulberry La., South Walpole, MA (US) 02071; Milan J. Merhar, 697 Boylston St., Brookline, MA (US) 02445

( * ) Notice: Subject to any disclaimer, the term of this patent is extended or adjusted under 35 U.S.C. 154(b) by 0 days.

(21) Appl. No.: 10/147,149
(22) Filed: May 16, 2002

(65) Prior Publication Data

US 2002/0191176 A1 Dec. 19, 2002

Related U.S. Application Data

(60) Provisional application No. 60/291,274, filed on May 16, 2001, and provisional application No. 60/291,768, filed on May 17, 2001.

(51) Int. Cl.[7] .............................................. G01N 21/00
(52) U.S. Cl. ...................................................... 356/73.1
(58) Field of Search ........................ 356/73.1; 359/112, 359/157, 158, 173; 380/256, 283, 270, 44, 46, 31

(56) References Cited

U.S. PATENT DOCUMENTS 5,418,905 A * 5/1995 Rarity et al. ................... 398/40
6,289,104 B1 * 9/2001 Patterson et al. ............ 380/283

FOREIGN PATENT DOCUMENTS

JP         405005698 A  *  1/1993

* cited by examiner

Primary Examiner—Tu T. Nguyen

(57) ABSTRACT

The invention relates to an entangled-photon apparatus capable of measuring particular characteristics of an optical element, device or channel. Specifically, the apparatus and a method of using said apparatus to measure polarization mode dispersion in an optical communications fiber is disclosed. The apparatus includes a source of entangled photons, which are injected into the device under test, and a quantum interference device for determining the state of entanglement of said photons after they pass through the device. The quantum interference device includes a variable, polarization-specific delay element that is incremented to null out polarization mode dispersion in the device under test, and a wavelength demultiplexer/array detector that permits simultaneous measurements across a wide wavelength band. A second preferred embodiment of the invention and method is suitable for characterizing PMD in-situ that is, PMD measurements can be made while an optical fiber is in use for optical communications.

38 Claims, 11 Drawing Sheets

POLARIZATION MODE DISPERSION CHARACTERIZATION APPARATUS AND METHOD

CROSS-REFERENCE TO RELATED APPLICATIONS

This non-provisional application claims the benefit of U.S. Provisional Patent Application Ser. No. 60/291,274, filed on May 16, 2001 and U.S. Provisional Patent Application Ser. No. 60/291,768, filed on May 17, 2001.

STATEMENT REGARDING FEDERALLY SPONSORED RESEARCH OR DEVELOPMENT

Not applicable

REFERENCE TO COMPACT DISK APPENDIX

Not applicable

BACKGROUND OF THE INVENTION

The present invention generally relates to the field of optical measurements. In particular, the present invention relates to a quantum optical system for the characterization of polarization mode dispersion in an optical system and the method of performing the characterization. The invention also relates to performing said characterization on an active (viz., in-use) optical communications channel.

As the demand for increased bandwidth continues, telecommunications providers are looking for new ways to provide the additional bandwidth. The ultimate bandwidth available in an optical communications channel (e.g., an optical fiber) is limited by its optical properties. In particular, if the transmission time of an optical pulse through an optical channel is dependent on its polarization, the channel is said to exhibit polarization mode dispersion (PMD). PMD results from the birefringence of optical materials in the optical path which leads to a differential propagation delay between the orthogonal polarization components of light transmitted through the optical channel. PMD limits the bandwidth of the optical channel because it broadens the optical pulses and increases the bit error rate (BER). As modulation speeds increase, pulse durations decrease, and accurate compensation of PMD are required to maintain a low BER. To control such compensators, precise characterization of the PMD of the optical channel is required. Additionally, the PMD of an optical channel depends on the wavelength of the propagating light. Presently, optical communications fiber are wavelength multiplexed. That is, one physical channel is used to carry many communications channels, where each communications channel is identified uniquely by the wavelength of the light it uses. Thus, in addition to accurate and precise PMD characterization, the co-temporal characterization of the PMD of each of the multiplexed wavelengths in the channel is required.

Prior art methods of characterizing PMD have depended on classical optical (as opposed to quantum optical) phenomena. For example, the NetTest NEXUS Polarization Mode Dispersion Measurement System employs a Michelson interferometric technique to analyze PMD. Essentially these prior art systems attempt to measure the amplitude and relative phase of the two vector components of the polarized light. Other prior art systems use an optical signal analyzer (OSA) to measure the effects of PMD (that is, the system measures power variations at a fixed set of output polarization states as function of wavelength). In the former case, the light that has passed through the device under test must be divided into two arms of an interferometer, potentially introducing non-common path errors, while with the second approach the dispersive phase delay is not measured directly, it being inferred from the measured intensity variations.

One object of the present invention is to provide an apparatus that uses quantum-optical phenomena to measure the effective time delay between polarization states of light the have propagated through an optical element. A second objective of the invention is to provide a method of performing PMD characterization on an optical element. A further objective of the invention is to provide a PMD characterization apparatus that may be used on an active communications channel, that is, in the presence of signal photons. Yet another objective of this invention is to provide a method of characterizing PMD in an active communications channel.

BRIEF SUMMARY OF THE INVENTION

The present invention relates to an apparatus and method for determining the PMD of an optical element and specifically of an optical communications fiber. The method includes the generation of a beam of "twinons". Twinons are a pair of quantum mechanically entangled photons, typically emitted from a parametric down conversion optical process. Each photon in a twinon has a corresponding twin photon that is correlated with it in frequency (or energy), direction (or momentum) and polarization. Each of these photons loses its individuality when it becomes one half of an entangled pair. In the invention, the apparatus is arranged such that each of the twin photons travels in substantially the same direction but differ in wavelength and polarization state. Specifically, the twin photons in this invention have orthogonal polarizations. Although every twinon in this invention has substantially the same total energy, each of the two twin photons generally has a different, random energy, within a range of energies determined by the configuration of the parametric down conversion.

The key to the invention is understanding that each twinon is a single entity that happens to be made up of two photons. The behavior of one photon is correlated with the behavior of the other, even when they appear to be in separate locations. When a twinon traverses an optical system in which there are multiple indistinguishable paths, quantum optical interference determines in which of the paths the photons will be detected. For example, destructive interference can prevent two different detectors from observing a photon simultaneously while quantum optical constructive interference can "force" one photon to appear at each detector. Thus, in the absence of any differential delay (viz., PMD) between the two orthogonally polarized twin photons, quantum-interference effects can either eliminate or reinforce coincident detections ("CD's") on two separated detectors.

In this invention, the twinon beam propagates through the optical element or device under test (DUT) and then impinges on a beamsplitter at the input of a quantum-interferometric device (QID). Unlike classical interferometers, a QID does not bring two interfering photons together on a single detector. Instead, the two arms of the device each terminate at a separate detector.

In the presence of a polarization-specific delay (viz., PMD) the twinon acts like two un-entangled photons. In this case, as in classical optics, each photon may be reflected or transmitted at the beamsplitter. About half of the time one photon will propagate down one arm of the QID and one photon will propagate down the other arm of the QID. Thus, when the photons are acting independently (that is, when they are distinguishable) the CD rate is substantially one half the maximum observable rate.

In the invention, one arm of the QID includes a variable, polarization-specific delay element. When this inserted delay from this element exactly compensates for the PMD induced delay, the twin photons are within a coherence length of each other and quantum interference takes hold. Depending on the phase of the photons, the CD count rate either dips to near zero or rises significantly. The inserted delay for which rate of coincident detections exhibits its maximum change is a measure of the PMD.

One arm of the QID used in this invention also includes a wavelength demultiplexer and an array of detectors. The demultiplexer directs photons in different wavelength bands into individual detectors in the array. Comparing the output of each detector in the array with the single detector in the other arm of the QID generates a wavelength histogram of detection coincidences as a function of polarization-specific delay. As in the single wavelength case, the variable delay at which each wavelength channel sees the CD rate dip or peak is the PMD for that wavelength.

In one embodiment the system includes an entangled photon source which projects a beam into the optical element to be measured, a beam dividing element to divide the light exiting the optical element to be measured into two beams, a polarization-specific fixed delay element and a polarization-specific, variable delay element in one of the two beams, an optical demultiplexer in one of the two beams, a plurality of first detectors to detect the light emerging from the optical demultiplexer, and a second detector. The entangled photon source generates photon pairs, each of said pairs includes a first twin photon and a second twin photon that are correlated in time, wavelength and polarization. The beamsplitter defines a first optical path and a second optical path, the two optical paths being indistinguishable in the quantum-optical sense. The polarization-specific, variable delay element introduces a variable, differential time delay between the two orthogonal polarization states of the photons in the system. The fixed polarization-specific delay element provides a time delay bias between the two polarization states, thereby allowing the variable delay element to provide relatively negative and relatively positive time delays. The optical demultiplexer is designed such that photons with wavelengths in specific predetermined wavelength bands are directed into a plurality of spectral beams. Each of the plurality of the first detectors is positioned to receive one of the plurality of spectral beams and each is sensitive to the arrival of individual photons. The second detector, also sensitive to individual photons, is positioned to receive light from the beamsplitter along the second optical path. In one embodiment the system also includes a processor in communication with the plurality of first detectors and the second detector. The processor determines if a coincident detection of photons has occurred.

In a second embodiment the apparatus includes the polarization-specific fixed delay element in the second optical path. In another embodiment the polarization-specific, fixed delay element and the polarization-specific, variable delay element are both located in the twinon beam before the beam dividing element.

Yet another embodiment of the apparatus includes an optical signal injector component and an optical signal extractor component at the source end and QID end of the DUT, respectively. Said injector and said extractor combine or separate said twin photon beam from an optical communication signal using wavelength, temporal, or spatial multiplexing. This embodiment may also have a fast shuttering device to block the entrance of the QID.

In one embodiment the method includes the steps of forming a first twin photon and a second twin photon, and transmitting the first twin photon and second twin photon through an optical element. The method includes the additional steps of identifying coincidences in the detection of the twin photons at a first detector and at a second detector after transmission through the optical element, determining a wavelength of said one of said twin photons, adjusting the relative delay in the paths taken by said twin photons, and determining said polarization mode dispersion of said optical element in response to said steps of detecting.

A second embodiment of the method includes the steps of forming a first twin photon and a second twin photon, and transmitting the first twin photon and second twin photon through an optical element. The method further includes the steps of combining said twin photons with an optical communications signal prior to transmission through said optical element and separating said twin photons from said communications signal after transmission through said optical element. The method includes the additional steps of identifying coincidences in the detection of the twin photons at a first detector and at a second detector after transmission through the optical element, determining a wavelength of said one of said twin photons, adjusting the relative delay in the paths taken by said twin photons, and determining said polarization mode dispersion of said optical element in response to said steps of detecting.

A third embodiment of the method includes all the steps of the second embodiment and, in addition, the steps of time multiplexing said twin photon beam and said optical communications signal.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE SEVERAL VIEWS OF THE DRAWING

The foregoing and other objects, features and advantages of the invention will become apparent from the following description in conjunction with the accompanying drawings, in which reference characters refer to the same parts throughout the different views. The drawings are not necessarily to scale; emphasis has instead been placed upon illustrating the principles of the invention. Of the drawings.

DETAILED DESCRIPTION OF THE INVENTION

Figure 1:
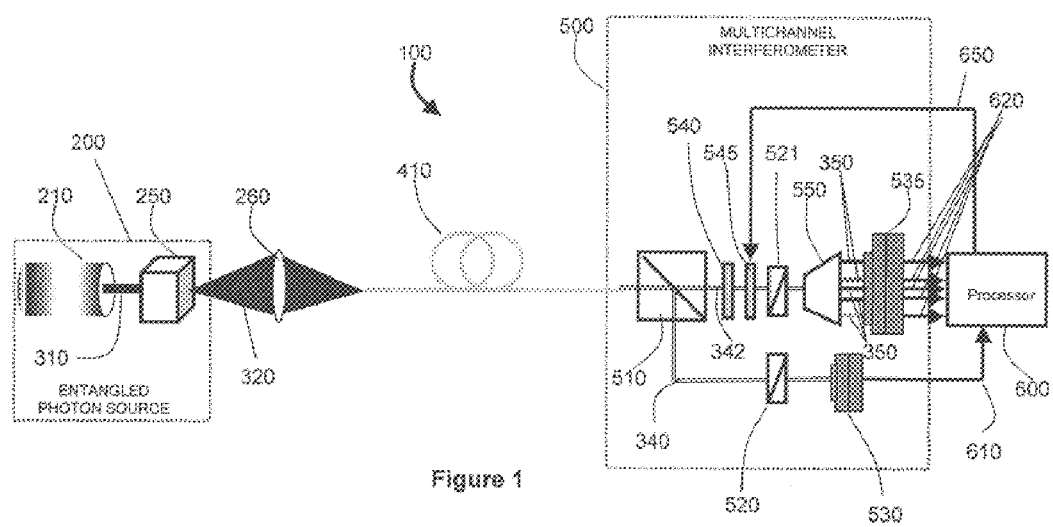
FIG. 1 is a highly schematic diagram of an embodiment of a quantum optical characterization apparatus built according to the invention.

Referring to FIG. 1, the inventive apparatus is a measurement system 100 for determining an optical characteristic (e.g., the PMD) of an optical channel, said system including an entangled photon source 200 for generating twin photons, coupling optics 260, a multichannel, quantum interference device (QID) 500 and a processor 600. The entangled photon source 200 includes a pump laser 210 and a nonlinear crystal 250. Pump laser 210 generates a pump laser beam 310 that is incident on nonlinear crystal 250. The intensity of pump laser beam 310 is sufficient to cause nonlinear effects, such as spontaneous parametric down conversion (SPDC), in crystal 250. Ideal SPDC results in each pump beam photon inducing the emission of two photons (twin photons or a twinon) simultaneously. Since energy and momentum are conserved in the process, the twin photons share the energy and momentum of the pump photon. This sharing entangles the momenta of the twin photons such that the emission of one photon in a given direction is associated with the simultaneous emission of its twin in a complementary direction. The twin photons may have the same frequency (and hence wavelength) or they may differ in frequency (and hence wavelength). Additionally, twin photons may be orthogonally polarized or have identical polarizations. In all cases, the entanglement persists regardless of the physical separation of the twin photons as long as no measurement that can distinguish one from the other is possible.

In the preferred embodiment, the twin photons are Type II, quasi-linear (but not degenerate) SPDC, which is to say they have orthogonal polarizations and travel in substantially the same direction but have different (but complementary) wavelengths. Generally, the wavelength and propagation direction(s) of twin photons are determined, in part, by the orientation of the nonlinear crystal 250 with respect to the pump beam 310. In the preferred embodiment this orientation is selected so the twin photons so generated form a twinon beam 320 propagating substantially parallel to pump laser beam 310. Coupling optics 260 couples twinon beam 320 into the optical channel or device under test (DUT) 410. Preferably the design of coupling optics 260 is determined by the optical characteristics of both emitted twinon beam 320 and DUT 410, using well known optical design principles.

Figure 2:
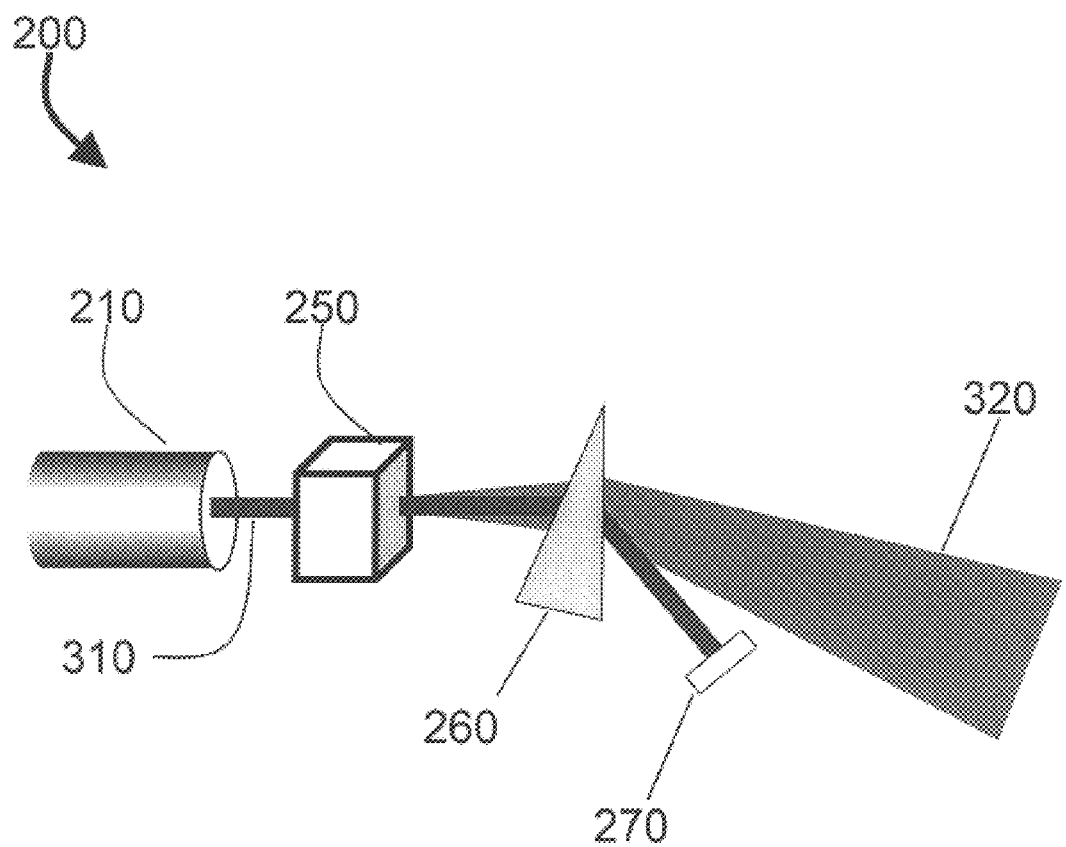
FIG. 2 is a schematic diagram of an entangled photon source that can be used in the characterization apparatus built according to the invention.

FIG. 2 illustrates one typical embodiment for source 200. The pump laser 210 is preferably a single-mode diode laser emitting a pump laser beam 310 with a wavelength preferably in the near-infrared. The wavelength of pump laser 210 is determined by the wavelength at which the DUT is to be characterized; because of the non-linearity of the SPDC process, the wavelength of the pump is selected to be substantially one-half the wavelength desired for the characterization process. For optical communications systems, the pump wavelength is preferably on the order of 775 nanometers. The inventors have determined that the pump laser power is preferably in the range of 10 to 100 milliwatts to produce a twinon beam of useful power. Other pump sources that produce comparable pump beams may also be used; for example, optical parametric oscillators and Ti:sapphire lasers (with doublers) have been used previously. The pump laser beam 310 is incident onto non-linear crystal 250. Preferably crystal 250 is beta barium borate (BBO) although LBO, KTP, or lithium niobate are alternatives that have been used advantageously in the past. Ideally, each pump photon entering crystal 250 interacts with the molecules in the crystal and is converted into a pair of twin photons through SPDC. The wavelength of the emitted twinon beam 320 is substantially twice the wavelength of the pump laser photon. In the preferred embodiment twinon beam 320 is substantially in the so-called optical communications C and L bands. The pump laser-to-crystal geometry is selected to create a twin photon beam 320 in which the emitted photons are substantially of the aforesaid Type II, non-degenerate. Twinon beam 320 propagates substantially parallel to pump laser beam 310. A filtering element 260 is typically placed in the emitted beam to separate any unconverted pump laser photons from the desired twinon beam 320. The filtering element is typically an optical interference filter, a dispersive prism (illustrated) or grating element. Any residual of pump beam 310 is captured by beam dump 270. Preferably the entire source 200 is maintained at a constant temperature to stabilize the characteristics of the twinon beam. Typically in electro-optical systems temperature is maintained actively by thermal isolation and Pelletier heater/coolers (not illustrated).

Figure 3:
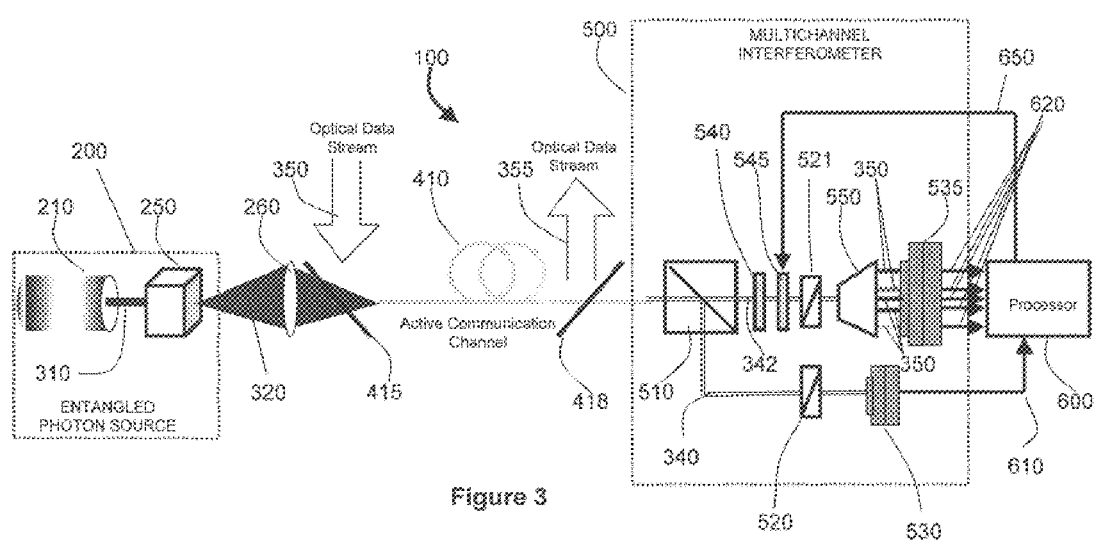
FIG. 3 is a highly schematic diagram of a second embodiment of a quantum optical characterization apparatus built according to the invention for use with an active communications channel.

FIG. 3 illustrates a second preferred embodiment of measurement system 100, adapted for use when the DUT is simultaneously in use as an active optical communications channel. In this embodiment a beam combiner element 415 is located between the source 200 and the DUT 410. The combiner 415 may be located on either side of coupling optics 260. Similarly, this embodiment includes a beam extractor module 418 located between the DUT 410 and the QID 500. Combiner 415 combines the twinon beam from source 200 with an active optical communications data stream 350 and injects the combined beams into a single DUT 410. Extractor 418 extracts data stream 355 from the twinon beam as the combined beams exit DUT 410. Although shown for purposes of illustration as beamsplitters, combiner 415 and extractor 418 are preferably lossless devices. For example, if measurements are only required at the ends of certain wavelength bands, a grating or prism can be used to interleave the twinon beam into the wavelength gaps in the communications data stream. In another, preferred, example, the devices can be so-called 1×2 optical switches, such as DiCon Fiberoptics, Incorporated's MEMS 1×2 Switch. This switch is based on a micro-electro-mechanical system (MEMS) chip. The MEMS chip consists of an electrically movable mirror on a silicon support. A voltage applied to the MEMS chip causes the mirror to rotate, which changes the coupling of light between a common fiber and two input/output fibers.

Figure 4:
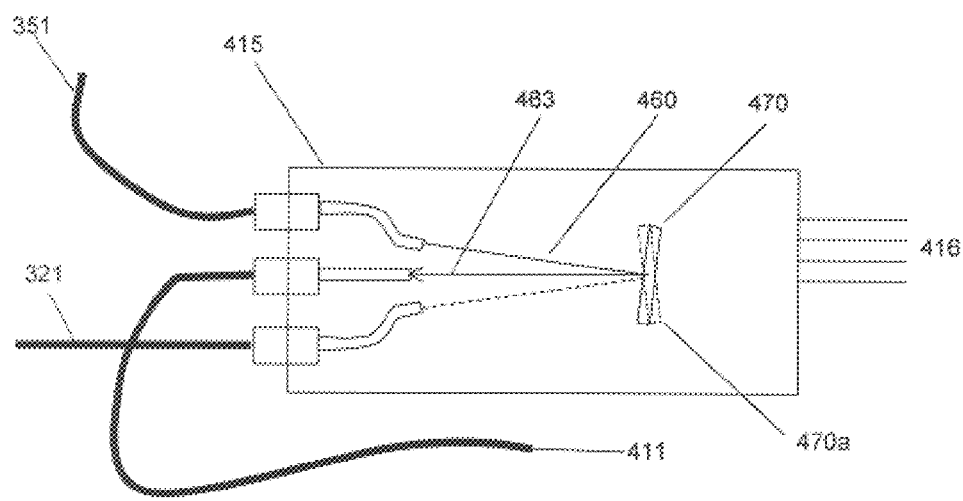
FIG. 4 illustrates a 1×2 MEMS switch for use as a beam combiner element in one embodiment of the measurement system built according to the invention.

FIG. 4 schematically illustrates a 1×2 optical switch as it would be used as combiner 415. In this mode the switch 415 alternately selects the twinon beam or the optical data stream to inject into the DUT. A first fiber optic pigtail 351 connects to a matching optical fiber (not shown) that carries said data stream while a second fiber optic pigtail 321 accepts the twinon beam from the coupling optics (not shown). Interior to the switch an electrically movable mirror 470 rotates under the control of externally generated control voltages, supplied via contacts 416, to direct either the optical communications data stream or the twinon beam onto a single output optical fiber 411. Mirror 470 is illustrated in the "data stream" position while phantom mirror 470a illustrates the "twinon position". Internal interface optics that are typically required in such a switch are not illustrated in the figure.

Returning to FIG. 1, the DUT 410 is typically an optical communications fiber, which might be many kilometers in length. Alternatively system 100 can be adapted for PMD measurements of other optical components, such as lenses, windows, and various optical systems by corresponding changes in coupling optics 260. Twinon beam 320 propagates through the DUT and is injected into the multichannel QID 500, wherein the measurement of the PMD is performed.

Figure 5:
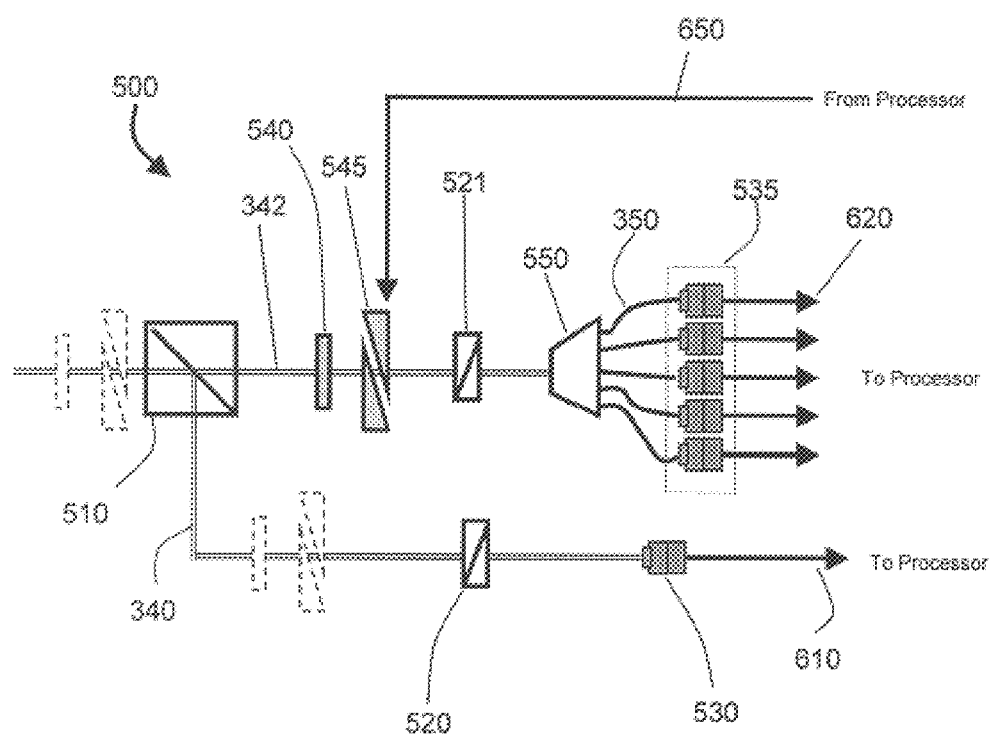
FIG. 5 is a schematic representation of a quantum-interference device that can be used in a characterization system according to the invention.

As shown in FIG. 5, the QID 500 includes a separation element 510 which provides two alternative optical paths for the twinons exiting the optical fiber DUT 410. In the preferred embodiment, the separation element 510 is a substantially non-polarizing beamsplitter in which light is split into two substantially equal beams; reflected photons propagate along a first optical path 340 and transmitted photons propagate along a second optical path 342. One of the benefits of using quantum optical effects is that separation element 510 may deviate from the ideal 50:50, non-polarizing example without introducing errors in the PMD measurement. The primary effect of deviations from the ideal is to increase the measurement time required to complete the desired measurement. In one preferred embodiment, separation element 510 is a fiber optic splitter. One example of such a device is JDSU model SPM-102ASP1xx polarization maintaining splitter.

The first optical path 340 includes a polarization analyzer 520 and a single optical detector 530, said detector capable of detecting single photon events. Any photon directed into that path by separation element 510 may be polarized in either of the two possible orthogonal polarizations. Polarization analyzer 520 is oriented with its polarization axis substantially half way between the two possible polarizations, allowing both polarizations to pass with equal probability and thereby ensuring that detector 530 cannot differentiate between the two orthogonally polarized twin photons that make up the twinon. Such ambiguity is essential to maintaining the photon indistinguishability on which this invention rests. Preferably, analyzer 520 is a prism polarizer, for example, a Glan-Thompson prism. In one preferred embodiment, analyzer 520 is a fiber optic polarizer, such as Oz Optics Limited's model FOP-01. Detector 530 produces an electrical pulse output on signal line 610 each time it senses a photon.

Detector 530 is adapted to detect single photon events. In the preferred embodiment, for the wavelengths of interest, detector 530 is a Avalanche Photo Diode (APD). Further, the preferred embodiment uses an actively quenched, Pelletier-cooled APD. Alternative detectors that can be used (depending on system wavelength bands) are photomultiplier tubes and intensified photodiodes.

The second optical path 342 includes a polarization-specific fixed delay element 540, a polarization-specific variable delay element 545, a polarization analyzer 521, an optical demultiplexer 550 and a linear optical detector array 535, each element of which is adapted to detecting single photon events. The fixed delay element 540 is a planar block of birefringent material, typically quartz, the optical axis of which is substantially parallel to one of the polarization axes defined by crystal 250 in source 200. This fixed delay element operates as a negative bias in cooperation with the variable delay element 545 to provide both relatively negative and a relatively positive delay of one polarization relative to the orthogonal polarization. Variable delay element 545 introduces different delays for the two possible orthogonal polarizations of the twin photon. This element will be described in more detail below. After passing through delay element 545 and the polarization analyzer 521, any photons in this path enter the optical demultiplexer 550. As in the first path, analyzer 521 is oriented with its polarization axis half way between the two polarizations, ensuring that detector 535 cannot distinguish between the two orthogonally polarized twin photons that make up the twinon. Preferably analyzer 521 and analyzer 520 are parallel to each other. Said orientation results in a coincident detection null when the PMD measurement is made. Alternatively, analyzer 521 and analyzer 520 may be orthogonally oriented, said orientation resulting in a CD maximum when the PMD measurement is made.

Although FIG. 1 illustrates the preferred embodiment with both fixed-delay element 540 and variable delay element 545 in beam 342, FIG. 5 illustrates in phantom an equally preferred embodiment that locates both or either of these elements in beam 340 with no loss of performance. In an alternative embodiment both or either element may be located in front of QID 500, although a reduction in measurement precision may occur.

Figure 6:
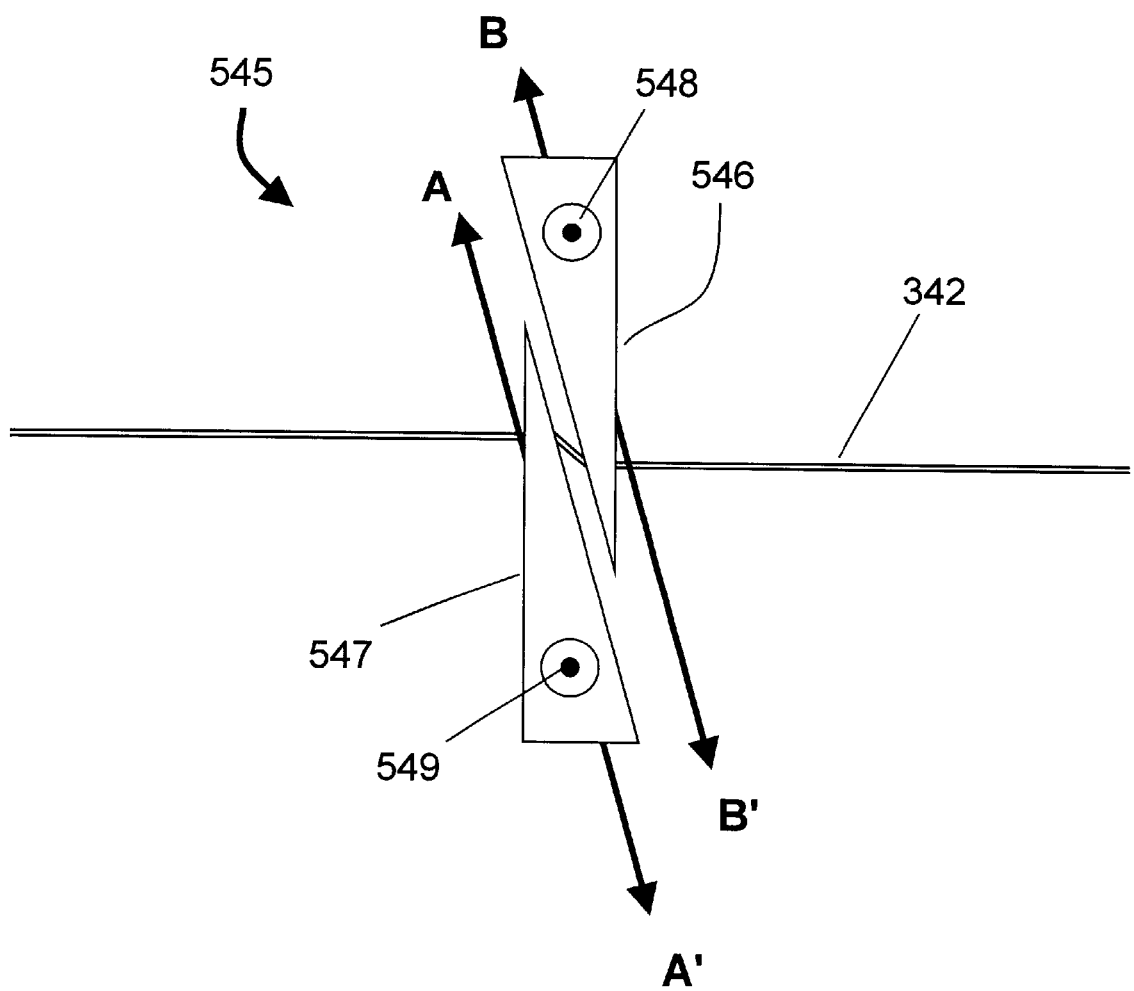
FIG. 6 illustrates the concept of operation of a polarization-specific variable delay device suitable for use in the quantum-interference device built according to the invention.

FIG. 6 illustrates at a conceptual level an example of a polarization-specific variable delay element. The delay element 545 is primarily composed of two substantially identical birefringent wedge prisms 546, 547, typically fabricated from quartz, said prisms having their optical axes parallel to each other and perpendicular to the optical path 342. In the figure the optical axes are indicated by the encircled dots 548, 549. Each prism is aligned symmetrically such that their exterior facing surfaces are parallel when their interior faces are parallel; in other words, the apexes of the prism form complementary angles between the parallel planes formed by their exterior faces. Additionally, the prism pair is aligned in beam 342 with their exterior faces perpendicular to the beam. In this configuration the prism pair displaces but does not deviate beam 342.

Each of the prisms 546, 547 is mounted on a motorized stage (not illustrated) that has a translation axis parallel to the interior faces of the prisms. These axes are indicated by double headed arrows A–A' and B–B' respectively. To change the differential delay the prisms are driven in opposing directions on their respective stages. The only optical effect of this motion is to increase the thickness of birefringent material in beam 342.

An alternative, commercially available polarization-specific delay element is JDSU Lithium Niobate Waveguide Polarization Controller. Currently available for C-band only, this device is a fully solid state approach to adjusting the differential polarization delay.

Figure 7:
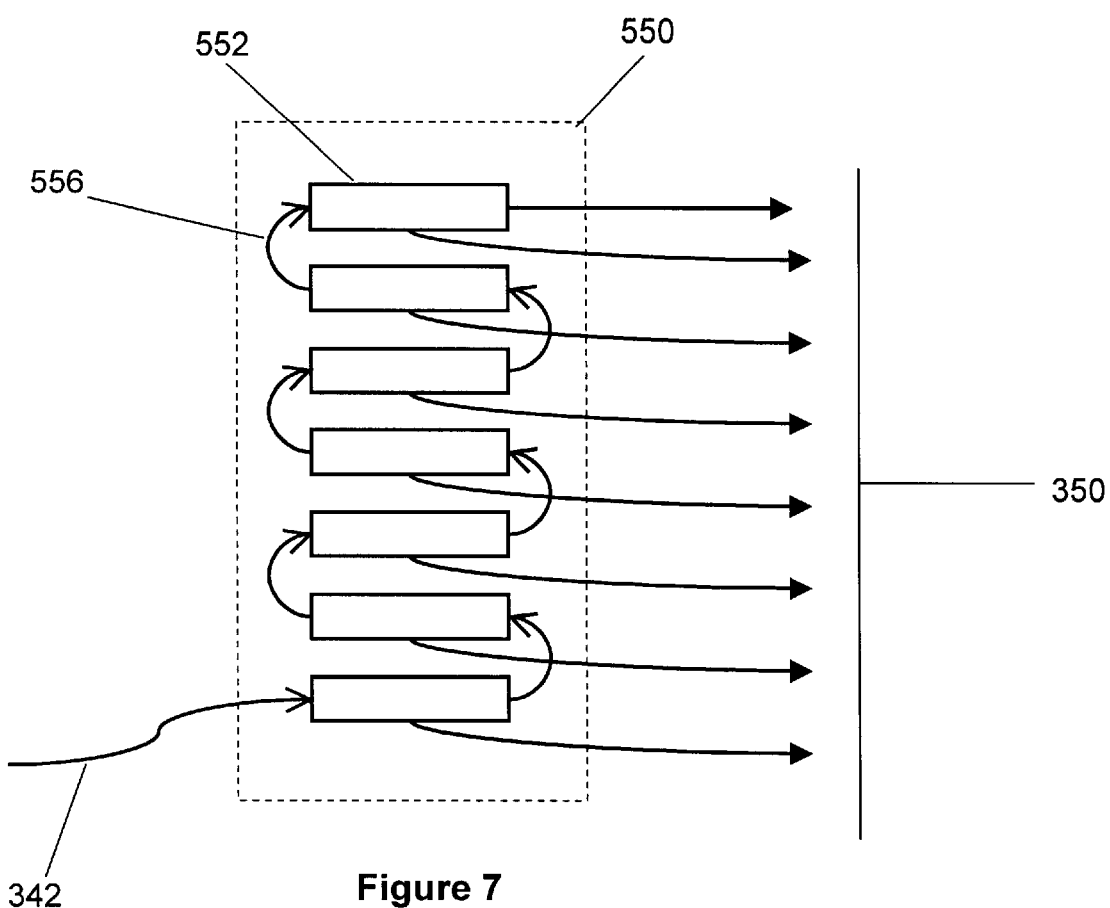
FIG. 7 is an illustration of a demultiplexer suitable for use in the quantum-interference device built according to the invention.

Demultiplexer 550 can be any element that spatially separates incident photons according to wavelength. For example, demultiplexer 550 can be a prism or a grating. As shown in FIG. 7, a preferred embodiment demultiplexer 550 is created from a series of so-called fiber optic add/drop modules, each tuned to wavelength band of interest. Demultiplexer 550 can be created by "daisy chaining" add/drop modules 552. Each add/drop module 552 has an input port an output port and a tap port. Each add/drop module has the property of picking off a selected wavelength band from the input signal to send out the tap port while transmitting the rest of the signal out the output port. The modules 552 are connected with short fiber optic cables 556 and the various output tap fiber optic cables collectively form the demultiplexer output 350. The JDSU Wideband Arrayed Waveguide Grating modules are typical examples of a commercially available demultiplexer of this type.

As illustrated in FIG. 1, the demultiplexer 550 generates a plurality of spectral beams 350, one for each detector in the linear detector array 535. Each spectral beam 350 includes a unique wavelength range from the broadband spectrum of photons generated by photon source 200. Detector array 535 produces an electrical pulse output signal each time it senses a photon, said pulse occurring on one of the multiple signal output lines 620.

Ideally, each element in detector array 535 has a performance characteristic that is equivalent to detector 530, viz., an actively quenched, cooled APD. Said devices are still experimental in array format. Thus, in the preferred embodiment of the invention illustrated in FIG. 1, the detector array 535 is best viewed as notional only. In the presently preferred embodiment, illustrated in FIG. 5, detector array 535 is implemented as a collection of discrete detectors, each of said detectors being identical to detector 530. As a matter of practical implementation, the use of discrete detectors in lieu of an array detector eliminates many alignment and system design issues; demultiplexer 550 is commercially available with connectorized pigtails for each output channel to which the discrete detectors of "array" 535 may be connected.

Returning to FIG. 1, each of the multiple output signal lines 620 provides an output signal to the processor 600 corresponding to each detector element in the linear detector array 535. Similarly, the signal output line 610 for detector 530 of the first optical path 340 provides an output signal to the processor 600. Each detector output signal indicates the arrival of a photon at single detector 530 or a respective detector element in the linear detector array 535.

Figure 8:
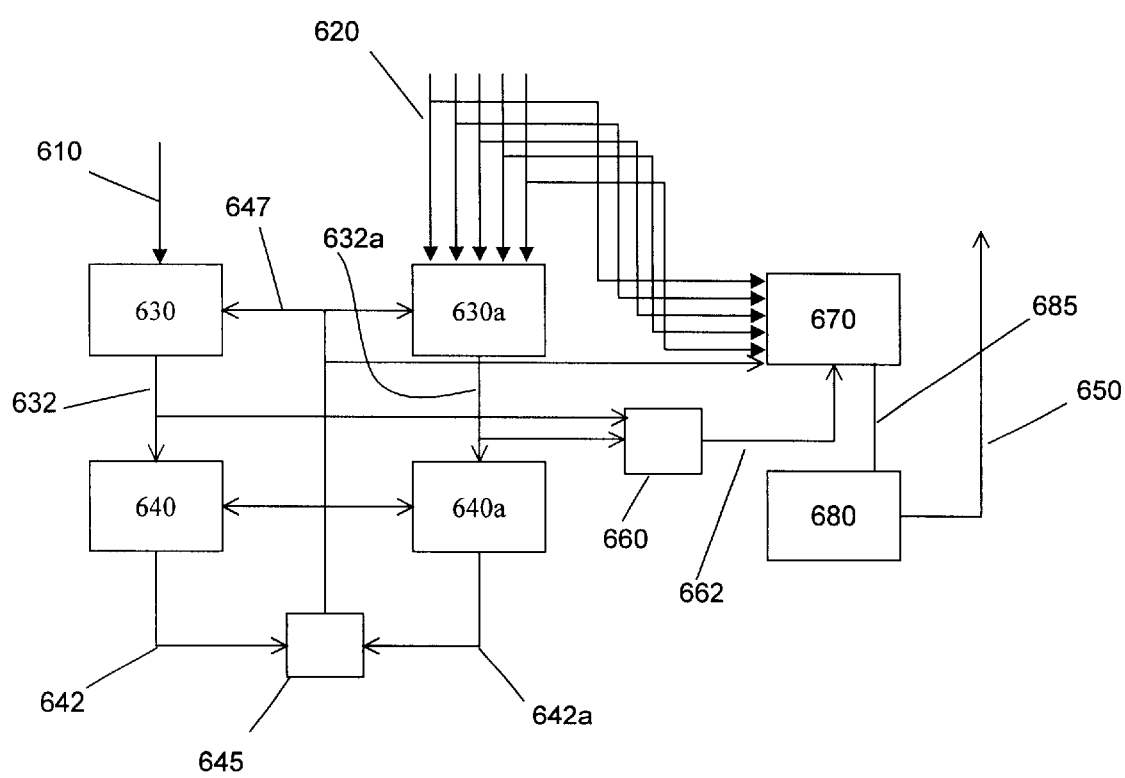
FIG. 8 is a schematic representation of a processor logic to identify coincident detections.

Processor 600 generally provides two functions. First, it identifies and records the rate of simultaneous photon detections, or coincident detections (CD's) between the two optical paths 340, 342. Second, processor 600 generally controls the delay of variable delay element 545. As the processing logic illustrated in FIG. 8 shows, processor 600 accepts logic level signals from detector 530 and from each element in detector 535 on signal lines 610 and 620 respectively. Signals on these lines trigger latching OR gates 630, 630 respectively. OR gate 630 simply provides the latching function while OR gate 350a also functions to aggregate the multiple signal lines 620. The output signals 632, 632a from OR gates 630, 630a in turn trigger timing circuits 640, 640a respectively. Each timing circuit, once triggered, runs for a pre-determined gate time, said gate time being substantially equal to the maximum expected PMD in the DUT. The gate time is the time window within which a coincident detection is allowed. The length of this gate time also limits the rate at which source 12 may emit twinons, since spurious CD's will be recorded if more than one twinon can be in the QID during the gating interval. The gate time is typically between 1 and 2 nanoseconds. When either timer 640 or 640a reaches the pre-determined gate time, said timer sends a logic signal to an OR gate 645. The OR gate 645 generates a reset signal 647 when it receives a signal from either timer. The reset signal 647 is distributed to OR gates 630, 630a, timers 640, 640a, and multi-channel analyzer 670. The reset signal marks the end of the allowable gate time for coincident detections and erases the processor memory of the first photon detection.

Output signals 632 and 632a are also transmitted to an AND gate 660. The AND gate 660 generates an output signal 662 when a CD occurs (viz., detections are indicated on both gate inputs). Signals 620 and 662 form the primary inputs to a multi-channel analyzer 670. Additionally, processor 600 includes a time delay controller 680. Controller 680 is responsible for incrementing the variable delay element 545 during the measurement. Typically, controller 680 provides an analog signal to delay element 545 over line 650 and sends a digital increment count to multichannel analyzer 670 over line 685.

Internally (not illustrated), multi-channel analyzer 670 comprises two or more latching accumulators, one such accumulator for each spectral signal 620, and an array of N×M storage registers, where N is the number of accumulators and M are the number of time delay increments. During operation, each latching accumulator latches any signal coming from lines 620. If a CD occurs, line 662 goes high and the latched input is added to the corresponding accumulator. This process continues during the integration period for the current time delay increment. At the end of the integration time for the current time delay increment, controller 680 send a signal to analyzer 670 on line 685. Said signal causes analyzer 670 to transfer the accumulated CD counts from the accumulators to the aforementioned registers. The transfers are directed into the N registers associated with the specific time delay. The accumulators are then reset to zero.

When either timer 640 or 640a reaches the pre-determined gate time, said timer sends a logic signal to an OR gate 645. The OR gate 645 generates a reset signal 647 when it receives a signal from either timer. The reset signal 647 is distributed to OR gates 630, 630a, timers 640, 640a, and multi-channel analyzer 670. The reset signal marks the end of the allowable gate time for coincident detections and erases the processor memory of the first photon detection.

It will be understood that the processor 600 may be configured in many equivalent ways to perform the above described functions and that a specific embodiment is described here only for purpose of illustration of the processing logic required by the invention.

System Operation

Returning to FIG. 5, in operation, after transmission through DUT 410, each twinon is presented with two potential optical paths to follow, path 340 and path 342. There are two cases of expected behavior to consider; when the two twin photons are separated in time by longer than their entanglement length (that is, when they become distinguishable from each other) and when they are essentially coincident in time (or indistinguishable). The operation of the invention will be described by first considering the former case and then considering what happens as the variable delay is introduced to eliminate the PMD delay.

In the first case (viz., where a polarization specific delay has affected the twinon), the optical components in the QID behave as would be expected using classical optics. Each of the two photons has a 50% probability of being either reflected or transmitted by separation element 510. In path 340 the photons pass through analyzer 520 (with a 50% probability since it is oriented at 45 degrees) and impinge on detector 530. An output pulse is generated and sent to processor 600. Similarly, in path 342, assuming the variable delay element 545 is set for zero delay, the photons pass through analyzer 521, are dispersed by demultiplexer 550, and are detected by the corresponding detector in detector array 535. An output pulse is sent from the corresponding detector in detector array 535 to processor 600. Processor 600 identifies and records coincident detections of photons in any of the detectors in array 535 and the one detector 530. Half of the time the two photons propagate down the two paths and trigger a CD, which is noted by the processor. The other half of the time both photons travel down the same path (either path 340 or path 342). These photons arrive at the same detector and do not trigger a CD. The rate of CD's in the presence of PMD is the baseline rate. In this invention, the above description applies individually to each wavelength channel defined by the demultiplexer/array detector.

In typical operation, processor 600 continually monitors the detectors to record the rate of CD's while it (or an auxiliary processor) slowly adjusts variable delay element 545 over the range of expected PMD delay. As the magnitude of the inserted delay approaches the PMD delay (at at least one wavelength in the band of interest), the entangled photons start to overlap and to become indistinguishable (in the quantum-optical sense). At that point the classical optics model breaks down.

Now consider the behavior of the QID for entangled photons that are indistinguishable. The twinon, being a single entity, must be discussed in terms of a "wave function" that effectively describes both photons simultaneously in terms of the probability of detecting a photon at the detectors. The wave function also reveals how changes in the optical system affect the expectation value for a detection at one detector even when the changes take place in a separated optical path. In the context of the present invention, the inventors have both calculated the wave function predicting, and confirmed experimentally, that introducing a polarization-specific delay of the correct magnitude re-establishes the indistinguishability of the twinon.

When the photons are in the fully indistinguishable condition, the wave function predicts that either constructive or destructive quantum interference will occur. For the QID this means that either there will be a very high rate of CD's (approximately double the baseline rate established for the incoherent case) or there will be a very low rate of CD's (approaching zero). Which case obtains is determined by the specific configuration of the optical elements in the QID. In the preferred embodiment, analyzer 520 and analyzer 521 are oriented with their polarization axes parallel. In this configuration destructive interference occurs, so there will be a null in the CD rate when the inserted delay matches the PMD.

Figure 9:
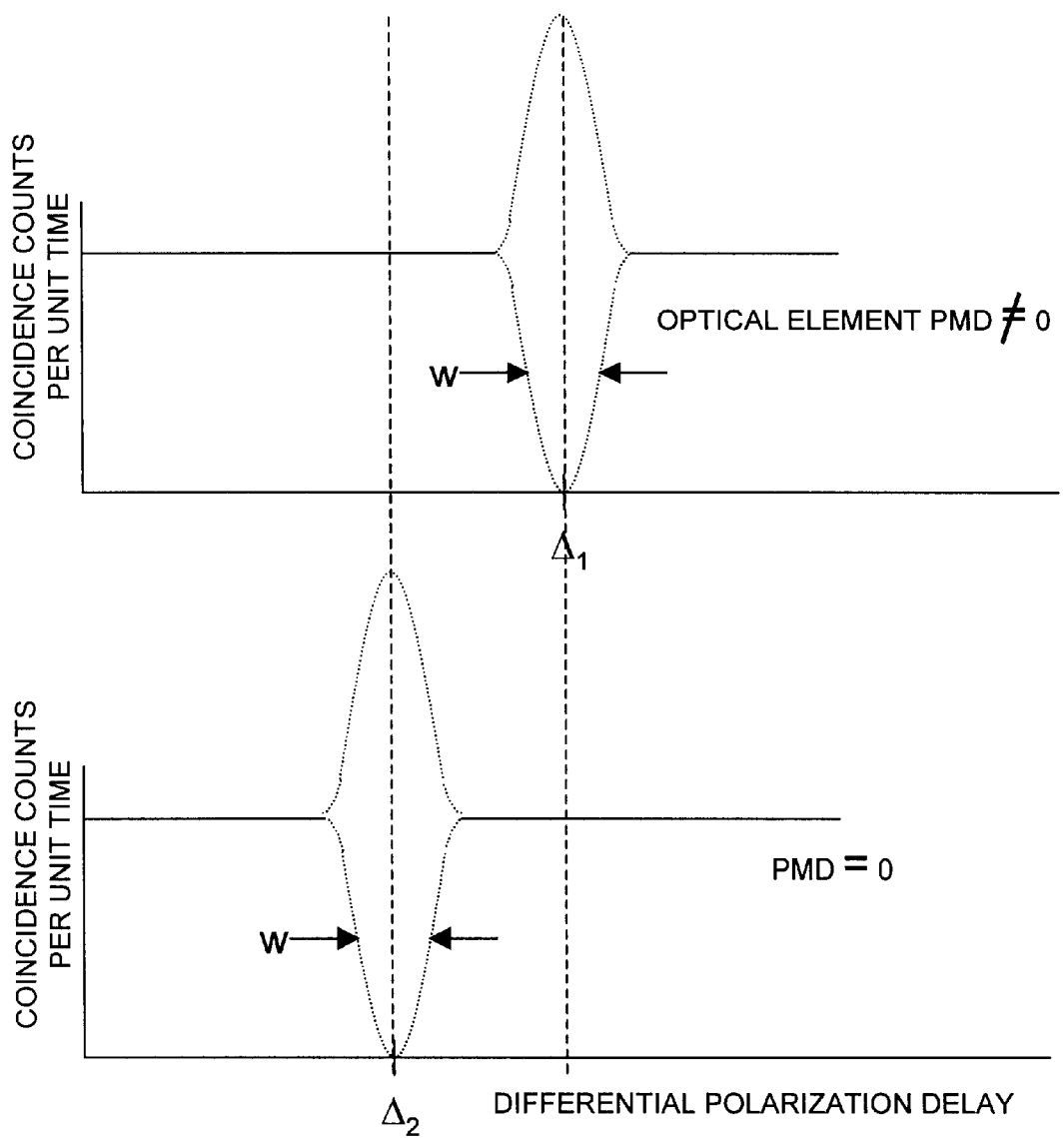
FIG. 9 is a graphical representation of coincidence count rates as a function of differential polarization delay for two different values of PMD.

Of course, as the inserted delay approaches the PMD (at a specific wavelength) there is a transition between the distinguishable and in distinguishable cases. Referring to FIG. 9, the coincidence rate 520 is shown as a function of the differential polarization delay (i.e., the difference in the optical delay for two orthogonal polarizations) as set by the variable delay element 545 for one spectral beam 350. The rate 520 exhibits an interference envelope 530 centered at one value of differential polarization delay, identified as Δ1. This delay value is the desired measurement of the PMD (once systematic error has been removed by calibration). The interference envelope has a finite width W because the optical delays experienced by different twinons are generally not the same. For example, photon pairs generated at different positions within the nonlinear crystal 250 travel through different paths in the crystal 250 and, therefore, experience different birefringence. Also, certain filters (e.g., interference filters) that might be used to limit the spectral bandpass of the measurement system 100 can increase the width W of the interference envelope due to the extra round trips for a photon "trapped" in the filter "cavity" before its exit.

In addition to the interference envelope 530, the coincidence rate 520 exhibits a rapidly oscillating fringe structure 540 underneath envelope 530. Whereas the envelope 530 is related to the optical group delay, the fringe structure 540 is related to the optical phase delay. In the context of this invention, it is the group delay (represented by the peak of window 530) that is the goal of the measurement. However, the fringe structure is much finer than the envelope function, so the invention advantageously uses the fringe structure to more precisely identify Δ1. As was described earlier, the phase of the fringe structure can be adjusted (by the orientation of analyzers 520 and 521) to ensure that center of envelope 530 coincides with a minimum in the fringe structure 540, thus creating a very distinct minimum in the CD count rate.

Two additional operational considerations remain. When the PMD of optical fiber DUT 410 is determined by varying the differential delay between the polarization components using the variable delay element 545, the measured value is the sum of the PMD of the DUT and any polarization specific delays in the apparatus. One calibration approach is to measure the delay Δ2, as shown in FIG. 9, required to achieve a CD null when the optical fiber DUT 410 is absent (i.e., the PMD is zero) This "reference" measurement can be made in advance of the measurement of the optical fiber DUT 410 at a different location by coupling twin photons directly from the entangled photon source 200 into the QID 500. The PMD of the optical fiber DUT 410 is the difference in the differential delays (Δ1−Δ2).

The second operational consideration is to account for the non-degeneracy of the twinon. As has been described, the two photons in each twinon have different but complementary wavelengths. Thus, the PMD measured from a specific spectral channel in the QID is, in reality, a function of the two complementary wavelengths. That is, the measurement is the time delay between, say, vertically polarized light at wavelength 1 and horizontally polarized light at wavelength 2. Thus the measured PMD value cannot be assigned directly one wavelength or the other. However, like most physical properties, PMD is a smoothly varying, predictable function of wavelength. Thus, the measured data can be fitted to the analytic model of the PMD and the accuracy achieved is determined by the number of wavelength bands sampled and the number of fitting coefficients in the model.

A second mode of operation of the invention is the characterization an optical communications fiber while said fiber is in active use for communications purposes. The preferred embodiment of the inventive apparatus for this mode of operation was discussed earlier with reference to FIG. 3 and FIG. 4. In this mode, the twinon beam is multiplexed with the optical data stream, transmitted through the DUT/Active Communications Channel, and demultiplexed for measurement in the QID. Said multiplexing may be accomplished spatially, temporally, or in frequency (wavelength). The schematic diagram of FIG. 3 illustrated spatial multiplexing for ease of illustration, but as previously discussed said spatial multiplexing is highly inefficient (approximately 75% of the energy in both beams is wasted) and this approach risks damage to the sensitive detectors in the QID. Although there are work arounds, the preferred embodiment for this active sensing mode is to perform temporal multiplexing with full transmission port switches, as described previously.

Figure 10:
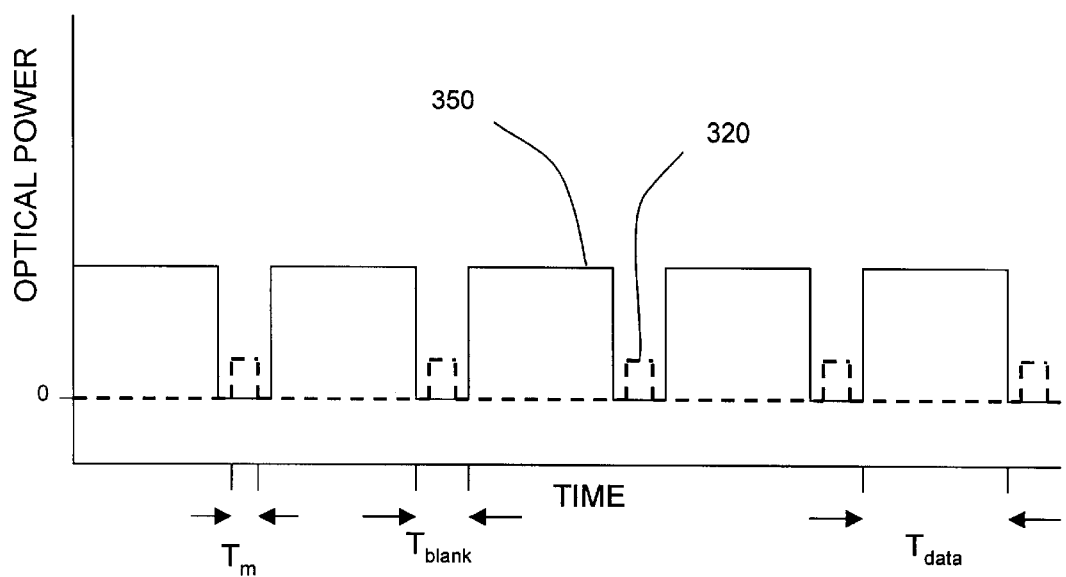
FIG. 10 is a graphical representation of the optical signal in the active channel when temporal multiplexing is used.

FIG. 10 illustrates the optical power in DUT 410 as a function of time when the optical data stream 350 and the twinon beam 310 are time multiplexed using a full on/off switch such as a MEMS 1×2 switch for the injector 415 and the extractor 418. Since the twinon beam and the data stream can never enter the DUT simultaneously, the measurement period Tm for performing PMD measurements is excluded from data transmission periods Tdata. Thus the measurement period Tm is confined to a "no-bits" interval Tblank during which no optical bits are transmitted in the optical data stream 350. The no-bits interval Tblank can be a component of the data format of the optical signal 350, for example a periodic event of fixed duration, such that time domain multiplexing of the twinon beam with the optical data stream 350 is possible. One example of a no-bits interval is the interpacket gap that exists between Ethernet frames. Alternatively, the no-bits interval can be created in the optical signal 350 by intentional transmission of a sequence of identical binary data bits where each bit is represented by the absence of optical power. For example, an extended sequence of "1" bits can be generated in a communications system in which a "1" is represented by the absence of optical energy and a "0" is represented as a light pulse. The extended sequence can be generated within an existing test or diagnostic region of the data sequence, or it can be part of an intentionally-generated data message inserted into the data stream to facilitate the measurement. The duration Tblank of the extended sequence is sufficiently long to provide a detection window for the twinon beam and can be a few optical bits in duration to as long as several milliseconds, depending on the desired duration of the measurement periods Tm. Of course, in the preferred embodiment the position of the switches in injector 415 and extractor 418 are synchronized with Tblank.

Although the preferred embodiment uses a switch to direct the optical data stream photons away from QID 500, the alternative embodiment using spatial multiplexing and a beamsplitter for extractor 418 will allow signal photons to reach the QID. Exposing detector 530 and the linear detector array 535 to uncontrolled illumination can cause saturation, preventing the subsequent detection of single photons. Additionally, the detectors can be blinded if background photon incidence is present during the test interval Tm. Narrow bandwidth optical filters (not shown) can be used to eliminate cross channel leakage of the spectral beams 350 provided by the optical multiplexer 550. Alternatively, an optical shutter can be placed in front of the detectors. The optical shutter is rendered transmissive for a period less than Tblank by a signal synchronized to the measurement periods Tm. In another embodiment, the detectors 530,535 are gated by an electrical signal to enable detection during the no-bits interval Tblank.

Finally, if wavelength multiplexing is used with a dispersive element for extractor 418, the twinon measurement intervals Tm can be inserted anywhere in the optical data stream 350, including during Tdata. In this embodiment some photon leakage of the optical data stream photons into the QID 500 may still occur, so including narrow bandwidth filter(s) (not shown) in front of QID 500 is preferred. The filters can be located inside QID 500 but they must not be located between the analyzers 520, 521 and their respective detectors 530, 535.

In one embodiment, detection of the optical data stream 350 (or a channel of the optical data stream 350) and detection of one of the twin photons is performed by a single detector (not shown). In this embodiment, sufficient recovery time is provided following the end of the data interval Tdata to allow the detector to change to single photon detection mode. After the measurement interval Tm expires and before the start of the subsequent data period Tdata, the detector mode is changed to permit detection of the optical signal data pulses.

Figure 11:
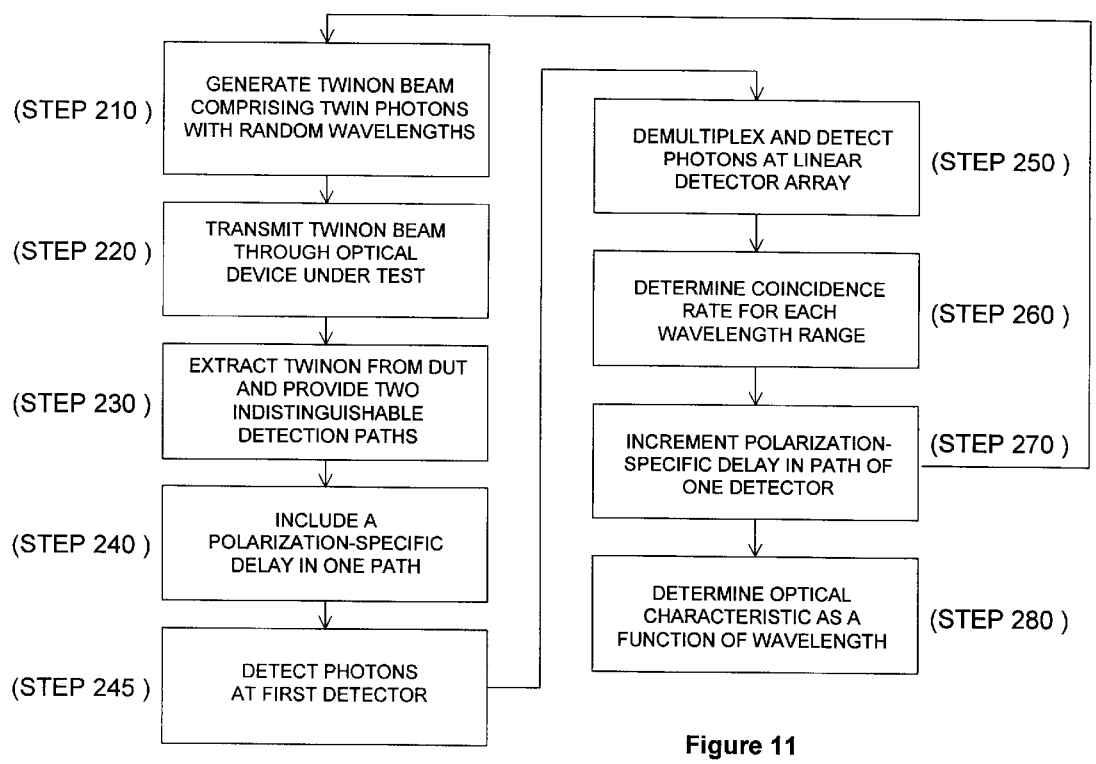
FIG. 11 is a flowchart representation of a method for determining an optical characteristic of an optical channel according to the invention.

Referring to FIG. 11, the invention includes a method for determining an optical characteristic of an optical device or element using an QID apparatus, said method includes the steps of generating a plurality of first twin photons and a plurality of second twin photons (a twinon beam) (step 210), said twinons having a random distribution of wavelengths in the band of interest, and transmitting said twinon beam into the DUT (step 220). The method further comprises the steps of extracting said twinon from the DUT and providing two indistinguishable, alternative optical paths to said twinon (step 230), and of including a polarization-specific delay in at least one of the said two paths (step 240). The method further includes the steps of detecting any photons reaching the end of one said optical path at a first detector (step 240) and of demultiplexing by wavelength the photons in one of said two optical paths and of detecting said demultiplexed photons in individual detector elements in a detector array (step 250). The method additionally includes the. steps of determining the coincidence rate for each of a plurality of wavelength ranges (step 260), adjusting the said variable delay, of sensing coincident detections of photons in said two optical paths, and processing said measurements to identify extrema in the coincident detection rate for each of said wavelength demultiplexed channels. The polarization-specific delay is adjusted (step 270) before the method returns to step 210. The method iterates steps 210 through 270 until sufficient coincidence data is acquired to determine a minimum (or maximum) in the coincidence rate for each of the wavelength ranges. The method includes the step of determining the optical characteristic of the optical device or element from the measured data (step 280), said step including calibration of said optical paths and performing mathematical fitting of the data to known models of the optical characteristic.

Figure 12:
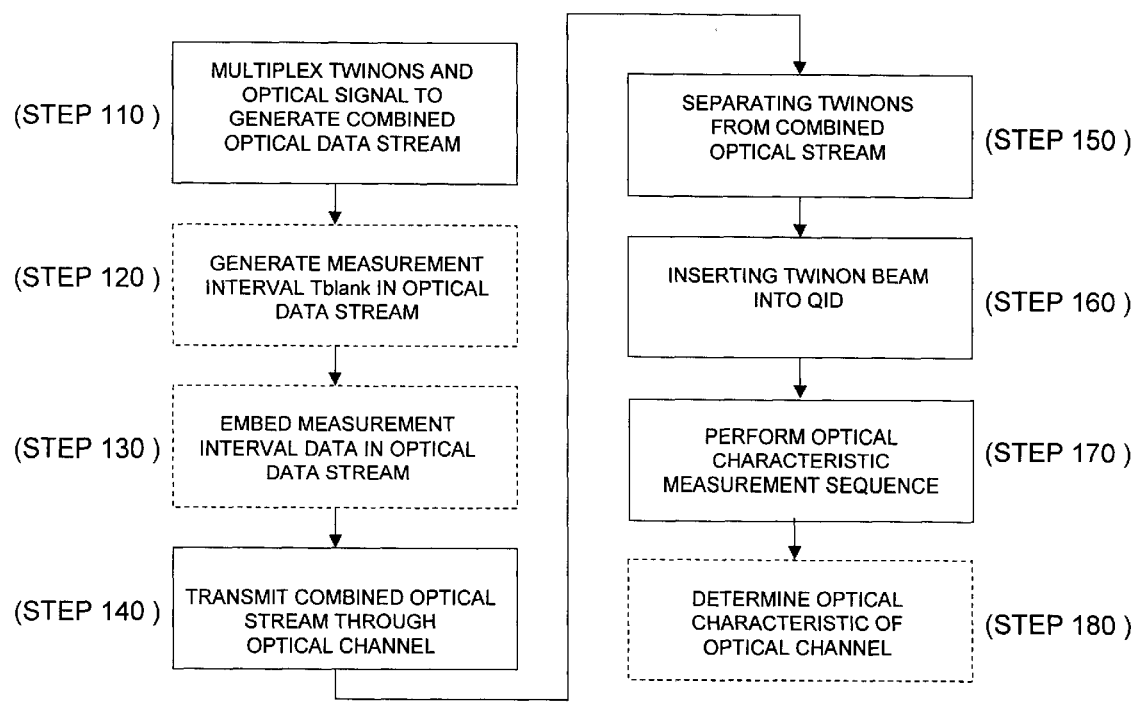
FIG. 12 is a flowchart representation of a method for determining the PMD of an active optical channel according to the invention.

Referring to FIG. 12, a method for determining an optical characteristic of an active optical communications channel includes the steps of combining a twinon beam and an optical data stream to create a combined optical stream (step 110) and transmitting the combined optical stream through the optical channel (step 140). In one embodiment, the method includes generation of a measurement interval in the optical data stream (step 120) by time multiplexing prior to transmission. In another embodiment, the method also includes the step of embedding measurement interval data in the optical data stream by wavelength multiplexing (step 130). The measurement interval data describes characteristics of the measurement intervals such as duration. The method also includes the steps of separating the twinon beam from the combined optical stream (step 150), inserting the twinon beam into the quantum interference device (step 160) and performing the optical characterization measure sequence (step 170). In one embodiment, the method also includes the step of determining the optical characteristic of the optical channel (step 180) in response to the measurements made in the QID (step 170).

What we claim as our invention is:

1. A quantum optical measurement system for determining an optical characteristic of an optical element comprising:
   - an entangled photon source in optical communication with the optical element to be measured, said entangled photon source generating a plurality of photon pairs (twinons), each of said twinons comprising a first twin photon and a second twin photon, said first twin photon being correlated to said second twin photon in at least one of time, wavelength and polarization;
   - a separation element in optical communication with said optical element to be measured, said separation element providing a first optical path and a second optical path for said twinons;
   - an optical demultiplexer in optical communication with said separation element along said first optical path, said demultiplexer adapted to provide a plurality of spectral beams, one of said spectral beams comprising one of said first twin photon and said second twin photon, from each of said twinons, at a predetermined wavelength;
   - a plurality of first detectors, each of said first detectors adapted to receive a respective one of said spectral beams; and
   - a second detector in optical communication with said separation element along said second optical path.

2. The quantum optical measurement system of claim 1 further comprising a electronic processing unit in communication with said plurality of first detectors and said second detector.

3. The quantum optical measurement system of claim 2 wherein said processing unit is adapted to identify coincident photon detections in said second detector, said coincident detections being photon detections in said second detector that occur within a pre-determined time window before or after a photon detection in one of said plurality of first detectors.

4. The quantum optical measurement system of claim 3 wherein said processor is adapted to generate a rate of coincidence detections.

5. The quantum optical measurement system of claim 1 further comprising:
   - a first polarization analyzer in optical communication with said separation element and said demultiplexer; and
   - a second polarization analyzer in optical communication with said separation element and said second detector.

6. The quantum optical measurement system of claim 5 wherein said axes of said first polarization analyzer and said second polarization analyzer are at substantially 45 degrees to a polarization axis of one of said first twin photons and said second twin photons.

7. The quantum optical measurement system of claim 6 wherein said axes of said first polarization analyzer and said second polarization analyzer are at substantially equal angles to a polarization of one of said first twin photons and said second twin photons.

8. The quantum optical measurement system of claim 1 wherein said plurality of first detectors is a linear array of detectors.

9. The quantum optical measurement system of claim 1 wherein each of said plurality of first detectors comprises a photon counting detector.

10. The quantum optical measurement system of claim 1 wherein said second detector comprises a photon counting detector.

11. The quantum optical measurement system of claim 1 further comprising a polarization-specific variable delay module in optical communication with said separation element.

12. The quantum optical measurement system of claim 11 wherein the said polarization-specific variable delay module comprises one or more polarization-specific delay elements, said elements jointly or individually in optical communication with said separation element.

13. The quantum optical measurement system of claim 11 wherein the said polarization-specific variable delay module imparts a time delay to the one of said twin photons, said twin photon polarized in a first polarization axis, said delay relative to the time delay imparted to the one of said twin photons polarized in a second polarization axis, said first and second polarization axes being orthogonal.

14. The quantum optical measurement system of claim 13 wherein the time delay imparted by said polarization-specific variable delay module is relatively positive or relatively negative.

15. The quantum optical measurement system of claim 1 wherein, for each of said twinons, said first twin photon has a first energy and said second twin photon has a second energy, the sum of said first energy and said second energy being substantially equal to a constant value.

16. The quantum optical measurement system of claim 15 wherein, for each of said twinons, said first energy of said first twin photon is distributed within a predetermined range of energy.

17. The quantum optical measurement system of claim 16 wherein said predetermined range of energy corresponds to photon wavelengths substantially between 1300 nanometers and 1700 nanometers.

18. A quantum optical measurement system for determining polarization mode dispersion comprising:
   - an entangled photon source, said entangled photon source generating a plurality of photon pairs (twinons), each of said twinons comprising a first twin photon and a second twin photon, said first twin photon being correlated to said second twin photon in at least one of time, wavelength and polarization;
   - an optical element to be measured in optical communication with said entangled photon source, said optical element receiving said plurality of twinons;
   - a separation element in optical communication with said optical element to be measured, said separation element providing a first optical path and a second optical path for said twinons;
   - an optical demultiplexer in optical communication with said separation element along said first optical path, said demultiplexer adapted to provide a plurality of spectral beams, one of said spectral beams comprising one of said first twin photon and said second twin photon, from each of said twinons, at a predetermined wavelength;
   - a plurality of first detectors, each of said first detectors adapted to receive a respective one of said spectral beams; and
   - a second detector in optical communication with said separation element along said second optical path.

19. The quantum optical measurement system of claim 18 wherein said optical element is a communications optical channel.

20. A method for determining polarization mode dispersion of an optical element comprising:
forming a plurality of first twin photons and second twin photons (twinons);
transmitting said plurality of twinons through said optical element;
providing a first optical path and a second optical path for said plurality of twinons, said paths being indistinguishable in the quantum-optical sense;
determining a wavelength for each of said plurality of twinons, said wavelength being the wavelength of one of said first twin photon and said second twin photon;
detecting one or both of said twin photons from each twinon in said plurality of twinons after transmission through said optical element at a first detector;
detecting one or both of said twin photons from each twinon in said plurality of twinons after transmission through said optical element at a second detector; and
determining said polarization mode dispersion of said optical element in response to said steps of detecting.

21. The method for determining polarization mode dispersion of an optical element of claim 20 further comprising the step of isolating said first detector and said second detector with polarizing elements, said polarizing elements oriented at 45 degrees to the polarization axes of said first twin photons.

22. The method for determining polarization mode dispersion of an optical element of claim 20 further comprising the step of delaying each of said plurality of twinons before detecting said twinon at said first detector, said delay being polarization-specific.

23. A quantum optical measurement system for determining an optical characteristic of an active optical channel comprising:
an entangled photon source, said entangled photon source generating a plurality of photon pairs (twinons), each of said twinons comprising a first twin photon and a second twin photon, said first twin photon being correlated to said second twin photon in at least one of time, wavelength and polarization;
an injector module having a first injector input port in optical communication with said entangled photon source, a second injector input port adapted to receive an optical data stream and an injector output port in optical communication with said optical channel, said injector module providing a combined optical stream at said injector output port;
an extractor module having an extractor input port in optical communication with said optical channel, a first extractor output port adapted to transmit said optical data stream and a second extractor output port in optical communication with a quantum interference device, said extractor module accepting a combined optical stream at said extractor input port;
a separation element, forming the input to said quantum interference device, in optical communication with said second extractor output port, said separation element providing a first optical path and a second optical path for said twinons;
an optical demultiplexer in optical communication with said separation element along said first optical path, said demultiplexer adapted to provide a plurality of spectral beams, one of said spectral beams comprising one of said first twin photon and said second twin photon, from each of said twinons, at a predetermined wavelength;
a plurality of first detectors, each of said first detectors adapted to receive a respective one of said spectral beams; and
a second detector in optical communication with said separation element along said second optical path.

24. The quantum optical measurement system of claim 23 further comprising a electronic processing unit in communication with said plurality of first detectors and said second detector.

25. The quantum optical measurement system of claim 24 wherein said processing unit is adapted to identify coincident photon detections in said second detector, said coincident detections being photon detections in said second detector that occur within a pre-determined time window before or after a photon detection in one of said plurality of first detectors.

26. The quantum optical measurement system of claim 25 wherein said processor said processor adapted to generate a rate coincidence detections.

27. The quantum optical measurement system of claim 23 further comprising:
a first polarization analyzer in optical communication with said separation element and said demultiplexer; and
a second polarization analyzer in optical communication with said separation element and said second detector.

28. The quantum optical measurement system of claim 23 further comprising a polarization-specific variable delay module in optical communication with said separation element and located in one of said first optical path and said second optical path.

29. The quantum optical measurement system of claim 23 wherein said injector module comprises an optical switch, said optical switch placing said injector output port in optical communication alternately and exclusively with one of said two injector input ports.

30. The quantum optical measurement system of claim 23 wherein said extractor module comprises an optical switch, said optical switch placing said extractor input port in optical communication alternately and exclusively with one of said two injector output ports.

31. The quantum optical measurement system of claim 23 wherein said injector module comprises a wavelength separation means, said means dividing a wideband optical beam into two or more narrowband optical beams, said two or more narrowband beams including pre-defined subsets of the wavelengths from said wideband optical beam, said means also combining two or more narrowband beams into a single wideband optical beam.

32. The quantum optical measurement system of claim 23 wherein said extractor module comprises a wavelength separation means, said means dividing a wideband optical beam into two or more narrowband optical beams, said two or more narrowband beams including pre-defined subsets of the wavelengths from said wideband optical beam, said means also combining two or more narrowband beams into a single wideband optical beam.

33. A method for determining polarization mode dispersion of an active optical channel comprising
forming a plurality of first twin photons and second twin photons (a twinon beam);
combining said twinon beam and an optical data stream to generate a combined optical stream;
transmitting said combined optical stream through said active optical channel;

separating said twinon beam from said combined optical stream;

detecting one or both of said first twin photons and said second twin photons at a first detector; and detecting one or both of said first twin photons and said second twin photons at a second detector.

34. The method of claim 33 further comprising determining said optical characteristic of said optical channel in response to said detection of said first twin photons and said detection of said second twin photons.

35. The method of claim 33 further comprising generating a measurement interval in said optical data stream.

36. The method of claim 35 further comprising embedding measurement interval data in said optical data stream, said measurement interval data indicating a temporal location of said measurement interval in said optical data stream.

37. The method of claim 33 further comprising the step combining said twinon beam and said optical data stream by time multiplexing.

38. The method of claim 33 further comprising the step combining said twinon beam and said optical data stream by wavelength multiplexing.

* * * * *